US 8,655,695 B1

United States Patent
Qu et al.

(12) United States Patent
Qu et al.

(10) Patent No.: US 8,655,695 B1
(45) Date of Patent: Feb. 18, 2014

(54) SYSTEMS AND METHODS FOR GENERATING EXPANDED USER SEGMENTS

(75) Inventors: Yan Qu, Cupertino, CA (US); Jing Wang, San Jose, CA (US); Yang Sun, Sunnyvale, CA (US); Hans Marius Holtan, San Jose, CA (US)

(73) Assignee: AOL Advertising Inc., New York, NY (US)

(*) Notice: Subject to any disclaimer, the term of this patent is extended or adjusted under 35 U.S.C. 154(b) by 508 days.

(21) Appl. No.: 12/775,826

(22) Filed: May 7, 2010

(51) Int. Cl.
G06Q 10/00 (2012.01)

(52) U.S. Cl.
USPC .................................. 705/7; 705/10; 705/14

(58) Field of Classification Search
USPC ................................................ 705/7, 10, 14
See application file for complete search history.

(56) References Cited

U.S. PATENT DOCUMENTS 6,839,680 B1 * 1/2005 Liu et al. ....................... 705/7.33
7,930,285 B2 * 4/2011 Abraham et al. ............. 707/706
2008/0162574 A1 * 7/2008 Gilbert ......................... 707/104.1
2010/0057560 A1 * 3/2010 Skudlark et al. ............. 705/14.49
2010/0082359 A1 * 4/2010 Chien et al. ...................... 705/1
2010/0082360 A1 * 4/2010 Chien et al. ...................... 705/1

* cited by examiner

Primary Examiner — Nga B. Nguyen
(74) Attorney, Agent, or Firm — Finnegan, Henderson, Farabow, Garrett & Dunner, LLP

(57) ABSTRACT

Systems and methods are disclosed for generating an expanded user segment based on a target segment of users associated with a specified target feature. In one implementation, a method is provided that includes receiving information about online activity by a set of users, the information including a unique user ID associated with each of the set of users; extracting from the received information, data about the set of users who are associated with the specified target feature; specifying one or more independent features relevant to a user association with the specified target feature; building a model that represents the probability of any user being associated with the specified target feature, based on the extracted data and the independent features; and using the model to score a network population of users relative to the specified feature, based on information received about online activity by the network population of users.

18 Claims, 8 Drawing Sheets

|  | Predictive Segment | Advertiser Subnet |
|---|---|---|
| Count of Cookies (Cookie Age > 1 hr, US, at least 1 Network impression | 1,237,300 | 42,743,264 |
| Actor Count (Cookie age > 1 hr, US, at least 1 network Impression) | 795 | 5,679 |
| Actor Rate | 0.064% | 0.013% |

*FIG. 7*

SYSTEMS AND METHODS FOR GENERATING EXPANDED USER SEGMENTS

BACKGROUND INFORMATION

1. Technical Field

The present disclosure generally relates to the field of data processing and online advertising. More specifically, and without limitation, the exemplary embodiments described herein relate to systems and methods for generating expanded user segments for use in targeted online advertising.

2. Background

As greater numbers of people use the World Wide Web for communication, commerce, and other daily activities, they generate larger and larger volumes of traffic over the Internet. Because the benefits of commercializing the Internet can be tremendous, businesses increasingly take advantage of this traffic by advertising their products or services online. These advertisements may appear in the form of leased advertising space (e.g., "banners") on content websites, which are operated by "publishers" who control the website content and the availability and cost of the advertising space or "ad inventory."

Advertisers of various products or services may create online advertising campaigns that include advertisements designed to be placed on content websites during a specified period of time. For example, an automobile company may design several advertisements for a new model and may wish to have the advertisements placed online during a period surrounding the launch of the new model. Each time an advertisement is shown to a viewer of the website it is known as an "impression." After an advertisement is shown, a user may select, or "click," on the advertisement or may take another "action" such as completing an online form to request more information. If the user purchases the new model of automobile, the purchase is referred to as a "conversion" of the impression. Advertisers may pay owners of content websites (i.e., the publishers) based on, for example, the number of impressions, clicks, actions, or conversions in connection with an advertising campaign.

In some cases, an advertiser may have a marketing plan that identifies certain types of people as being target audience members for a given product or service. For example, the advertiser may wish to spend money only on users having certain demographics or personal interests. Alternatively, advertisers may be unsure of which people are most likely to respond to a given product, service, or advertisement. Therefore, advertisers may wish to obtain very specific information about the types of consumers viewing various types of websites and responding to advertisements. In some cases, advertisers may be willing to spend more money per impression, click, action, or conversion based on known information about those users interacting with the advertisements. As a result, publishers of content websites and/or facilitators of third party advertising networks may wish to obtain as much information as possible about consumers and other users traveling between web pages associated with an advertising network.

One way of analyzing the Internet audience is segmentation, the process of dividing the total user population into smaller, but homogenous segments, according to some specified characteristics, such as geographical location, demographics, behaviors and responses to campaigns. Such segments can be offered to online advertisers who are interested in targeting specific segments that are most appropriate for their online advertising campaigns. For example, advertisers may want to target an ad campaign to users who have clicked on a particular website or banner ad. In some cases, online advertisers may be willing to pay more money per impression, click, etc. for users that fall within those specific segments.

User segments with characteristics of interest to the online advertisers, however, are not always targetable in large numbers, because the actual population of such qualified users can be quite small. For example, advertisers may be interested in targeting people who have provided certain demographic information (e.g., to a social networking site), or clicked on a particular advertisement, etc. However, the actual population of such users may be relatively small compared to the total Internet population. In addition, user segments with characteristics of interest to the online advertisers may not be immediately available. For example, an advertiser may want to target users who are likely to convert to its campaigns (i.e., click an advertisement and/or make a purchase), but who have not yet done so. The identification of such segments may involve the prediction of user behavior in the future, which is not yet available.

The present disclosure is directed to achieving one or more of the above-referenced goals by providing improved systems and methods for online advertising. Among other features and advantages, the disclosed embodiments perform online user profiling, and generate expanded segments of online users.

SUMMARY

In accordance with one disclosed exemplary embodiment, a computer-implemented method is provided for generating an expanded user segment for online advertising, based on a target segment of users associated with a specified target feature. The method may include: receiving information about online activity by a first plurality of users, the information including a unique user ID associated with each of the first plurality of users; extracting from the received information, data about the first plurality of users who are associated with the specified target feature; building, based on the extracted data, a model that represents the probability of any user being associated with the specified target feature; and using the model to score a second plurality of users relative to the specified target feature, based on information received about online activity by the second plurality of users.

In accordance with another disclosed exemplary embodiment, a computer-implemented method is provided for generating an expanded user segment based on a target segment of users associated with a specified target feature. The method may include: receiving information about online activity by a sample of users, the information including a unique user ID associated with each of the sample of users; extracting from the received information, data about the sample of users who are associated with the specified target feature; specifying one or more independent features relevant to a user association with the specified target feature; building, based on the extracted data and the independent features, a model that represents the probability of any user being associated with the specified target feature; and using the model to score a network population of users relative to the specified feature, based on information received about online activity by the network population of users.

In accordance with another disclosed exemplary embodiment, a system is provided for generating an expanded user segment based on a target segment of users associated with a specified target feature. The system may include a memory storage device configured to store instructions for generating an expanded user segment based on a target segment of users; and a processor configured to execute the instructions to perform the following: receiving information about online activity by a first plurality of users, the information including a unique user ID associated with each of the first plurality of users; extracting from the received information, data about the first plurality of users who are associated with the specified target feature; building, based on the extracted data, a model that represents the probability of any user being associated with the specified target feature; and using the model to score a second plurality of users relative to the specified target feature, based on information received about online activity by the second plurality of Internet users.

BRIEF DESCRIPTION OF THE DRAWINGS

The following figures are used to describe exemplary features and embodiments related to the present disclosure. In the figures:

FIG. 7 depicts a table comparing an exemplary actor rate for expanded predictive segments with the exemplary actor rate for a standard advertiser subnet.

DETAILED DESCRIPTION

Reference will now be made in detail to exemplary embodiments of the disclosure, examples of which are illustrated in the accompanying drawings. Wherever possible, the same reference numbers will be used throughout the drawings to refer to the same or like parts.

In view of the size limitations inherent in many targeted online advertising user segments, some advertisers may desire to target "look-alike" segments (i.e., larger "expanded" segments that demonstrate similar characteristics as the known segments), consistent with embodiments of the present invention. These so-called "expanded" or "look-alike" segments may be much larger in size, but similar in characteristics within a tolerable sacrifice in accuracy. Therefore, there is a need for automatically constructing expanded segments of users having features desired by advertisers. Accordingly, systems and methods are disclosed herein for the modeling and prediction of user-level "look-alike" segments or predictive segments for targets. The targets or users may be desired by advertisers or analysts, such as geographical information, demographics, contextual information, behavioral information, and/or advertiser campaign responses. The look-alike user segments can be used for reporting, targeting, and optimization of online advertising or marketing. In one embodiment, the disclosed systems and methods may utilize learning techniques to generate models that properly combine and weigh the contributions of characteristics of users for constructing look-alike segments. The disclosed embodiments may be scalable, so as to be able to apply a model to the entire Internet user population and generate an expanded look-alike segment within a suitable amount of time.

Figure 1:
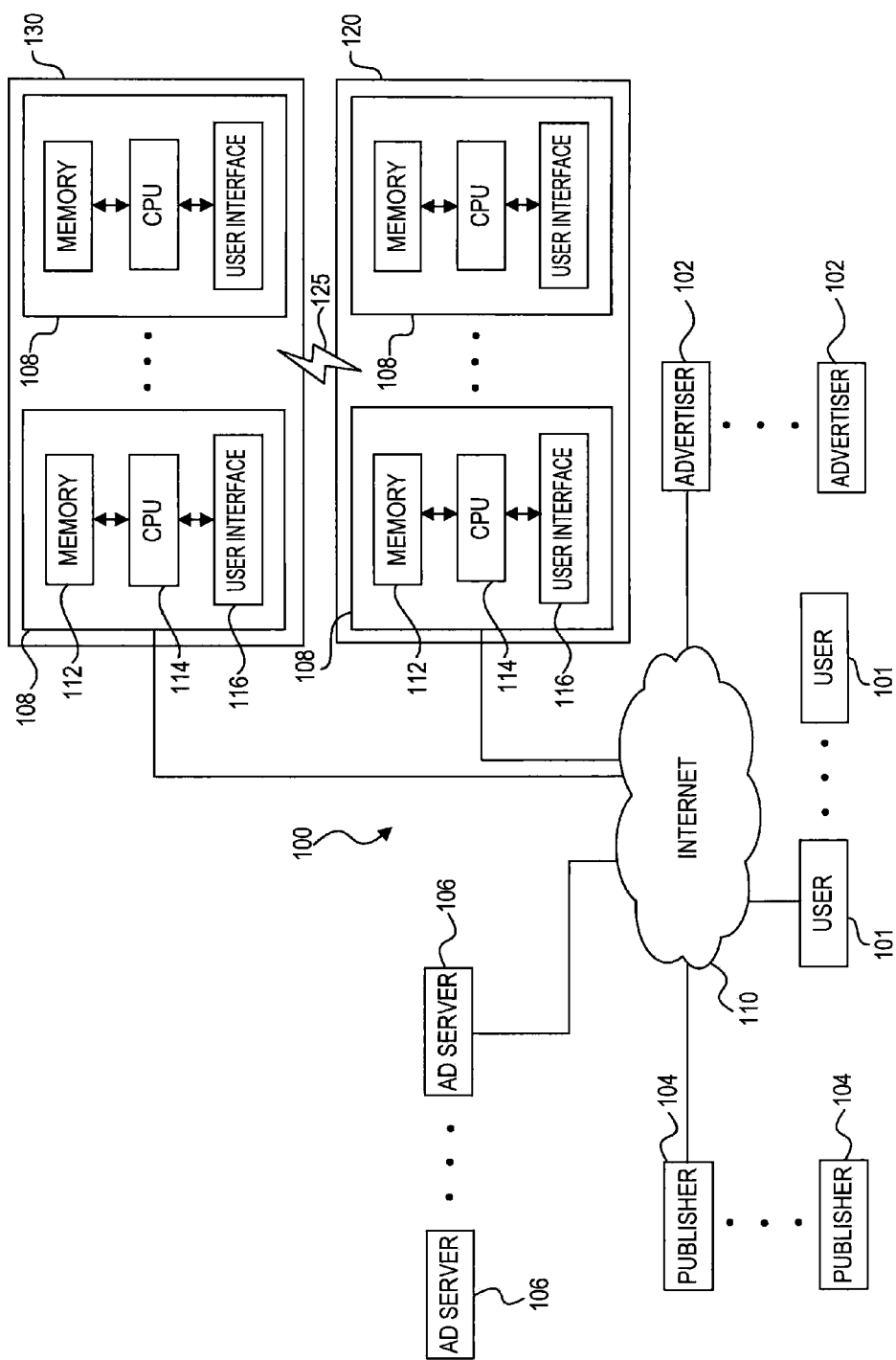
FIG. 1 depicts a block diagram of an exemplary system for generating expanded user segments.

FIG. 1 illustrates an exemplary system 100 for generating expanding user segments. System 100 may include a plurality of users 101, advertisers 102, publishers 104, ad servers 106, and machines 108, all disposed in communication with the Internet 110. In one embodiment, system 100 may include only machines 108, or only ad servers 106 and machines 108, while merely interacting with users 101, advertisers 102, and publishers 104. As will be described in more detail below, in general, system 100 may be configured to generate expanded "look-alike" segments of users.

Users 101 may include people using computers, personal digital assistants ("PDAs"), smartphones, mobile devices, Internet-enabled televisions, automobiles, or homes, or any other mobile or electronic device configured to access the Internet. Thus, the term "user," "customer," or "person," as used herein, may refer to any consumer, viewer, or visitor of a web page or site and can also refer to the aggregation of individual customers into certain groupings. References to customers "viewing" ads is meant to include any presentation, whether visual, aural, or a combination thereof. As will be described in more detail below, a set of attributes may be associated with each user, in a searchable profile. The attributes may reflect the user's interests and incorporate characteristics that impact advertisement selection, purchasing, and other online behavior. Attributes may be created based on user data, such as impression history, click history, purchase history, demographic data, etc.

Advertisers 102 may include any entities having online advertisements (e.g., banner ads, pop-ups, textual ads, video ads, etc.) desired to be delivered to online users. For example, advertisers 102 may have created advertisements relating to products or services marketable to one or more online users. Advertisers 102 may interact with publishers 104, ad servers 106, and/or machines 108 through computers connected to the Internet 110. Thus, advertisers 102 may be able to communicate advertising campaign information, such as ad information, targeting information, consumer information, budget information, bidding information, etc., to other entities in system 100.

Publishers 104 may include any entities having inventories of available online advertising space. For example, publishers 104 may include online content providers, search engines, e-mail programs, or any other online site or program having online user traffic. Publishers may also include mobile device manufacturers or operators, or any other providers of advertising space. Publishers 104 may interact with advertisers 102, ad servers 106, and/or machines 108 via computers connected to the Internet 110. Thus, publishers 104 may be able to communicate inventory information, such as site information, demographic information, cost information, etc., to other entities in system 100.

Ad servers 106 may include entities that implement any type of servers or server systems to process advertising information from advertisers 102 and/or site information from publishers 104, either directly or indirectly. In certain embodiments, ad servers 106 may be remote web servers that receive advertising information from advertisers 102 and serve ads to be placed on websites of publishers 104. Ad servers 106 may be configured to serve ads across various domains of publishers 104, for example, based on advertising information provided by advertisers 102. Ad servers 106 may also be configured to serve ads based on contextual targeting of websites, search results, and/or user profile information. Ad servers 106 may be configured to generate behavioral logs, leadback logs, click logs, action logs, conversion logs, and/or impression logs, based on users' interactions with websites and ads implemented by system 100.

In accordance with certain embodiments, computer implemented systems and methods may be provided that perform one or more of the following steps: receiving user activity data; extracting and merging user data based on a target feature; specifying independent features for model building; building a model based on the target feature and model specifications; using the model to score users on the target feature based on the merged user data; and segmenting users based on their target feature scores.

In order to perform user segmentation, machines 108 may include one or more computing systems configured to receive information from entities in system 100, process the information, and communicate the information with other entities in system 100, according to the exemplary embodiments described herein. Machines 108 may include any type or combination of computing systems, such as clustered computing machines and/or servers. For example, as shown in the embodiment of FIG. 1, a plurality of machines 108 may form a large-scale storage (LSS) component 120. Another plurality of machines 108 may form a distributed caching (DC) component 130, which may be disposed in communication with LSS component 120 through a communication terminal or network 125.

In one embodiment, each machine 108 may be an assembly of hardware, including a memory 112, a central processing unit ("CPU") 114, and/or a user interface 116. Memory 112 may include any type of RAM or ROM embodied in a physical storage medium, such as magnetic storage including floppy disk, hard disk, or magnetic tape; semiconductor storage such as solid state disk (SSD) or flash memory; optical disc storage; or magneto-optical disc storage. CPU 114 may include one or more processors for processing data according to instructions stored in the memory. The functions of the processor may be provided by a single dedicated processor or by a plurality of processors. Moreover, the processor may include, without limitation, digital signal processor (DSP) hardware, or any other hardware capable of executing software. An optional user interface 116 may include any type or combination of input/output devices, such as a display monitor, keyboard, and/or mouse.

As shown in FIG. 1, large-scale storage (LSS) component 120 and distributed caching (DC) component 130 may interact with each other and with system 100 to create web page profiles and user profiles, to extract features of users, to build user segment models, and to use models to segment users based on the user features, according to the embodiments described herein. In one embodiment, a plurality of software modules may operate on LSS component 120 and DC component 130 to perform user profiling and segmentation.

Figure 2:
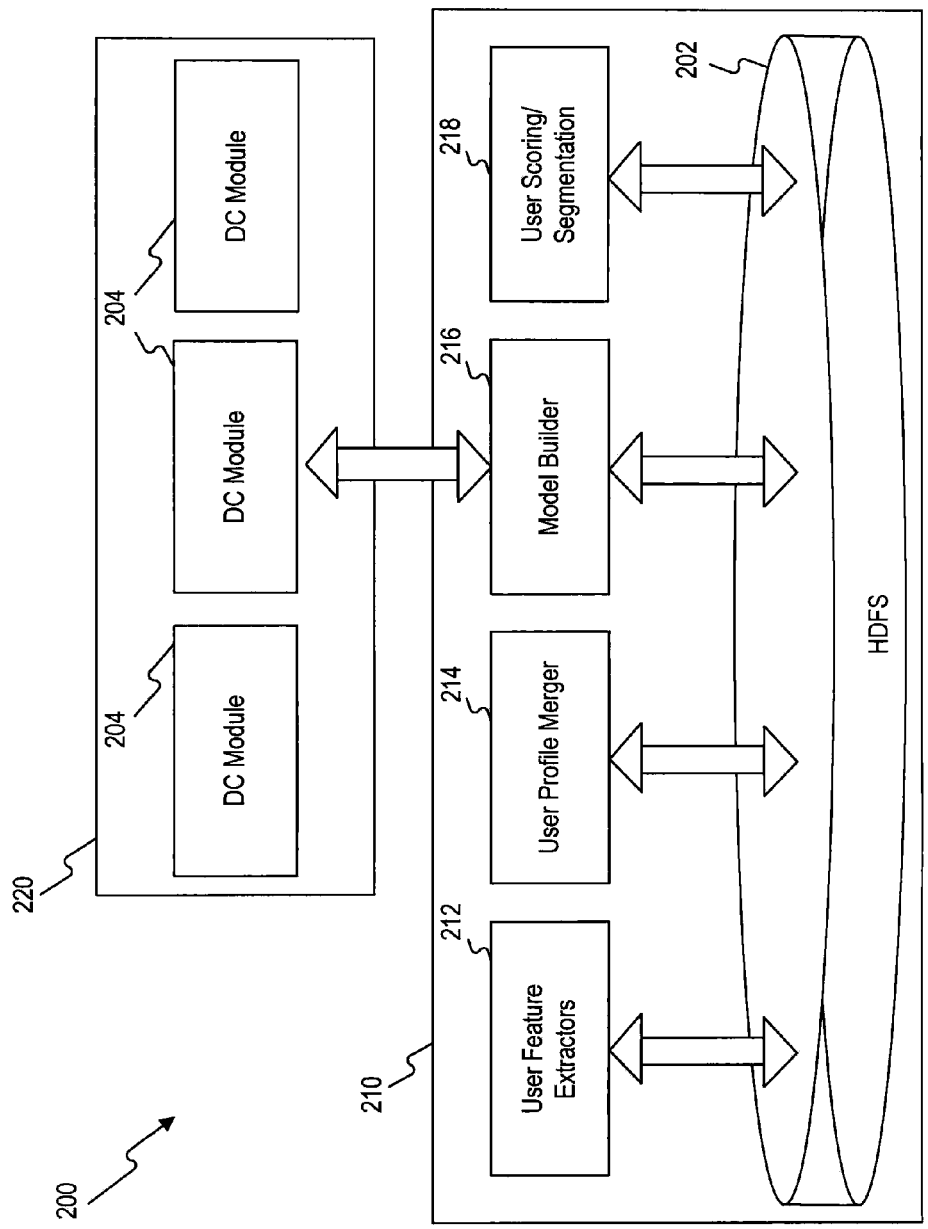
FIG. 2 depicts a block diagram of exemplary system of software modules that can be executed in the system of FIG. 1.

FIG. 2 illustrates one exemplary embodiment of a plurality of software modules 200, which may operate across LSS component 120 and DC component 130 for generating expanded user segments. For example, FIG. 2 generally depicts an update and batch processing complex 210 and a caching, indexing, and retrieval complex 220. In one exemplary embodiment, the update and batch processing complex 210 may operate with a Hadoop distributed file system (HDFS) 202 on LSS component 120. Meanwhile, the caching, indexing, and retrieval complex 220 may operate on DC component 130. Certain exemplary systems and methods disclosed herein are described with reference to an embodiment in which the LSS component 120 may include a plurality of clustered machines 108, and DC component 130 may include a plurality of clustered machines 108.

It will be appreciated that components 120, 130 may include any desired number or arrangement of clustered machines 108, as needed to provide suitable efficiency, storage space, and/or processing power. In addition, although machines 108 are described with respect to LSS component 120 and DC component 130, it will be appreciated that any suitable configuration of processors and data storage devices may be selected to carry out the embodiments described herein. The hardware associated with machines 108 and system 100 may be selected to enable quick response to various business needs, relatively fast prototyping, and delivery of high-quality solutions and results. An emphasis may be placed on achieving high performance through scaling on a distributed architecture. The selected hardware may be flexible, to allow for quick reconfiguration, repurposing, and prototyping for research purposes.

The data flows and processes described herein are merely exemplary, and may be reconfigured, merged, compartmentalized, and combined as desired. The exemplary modular architecture described herein may be desirable for performing data intensive, user segmentation. A modular architecture may also be desired to enable efficient integration with external platforms, such as content analysis systems, various plug-ins and services, etc. Finally, the exemplary hardware and modular architecture may be provided with various system monitoring, reporting, and troubleshooting tools.

In one embodiment, Hadoop distributed file system ("HDFS") 202 of update and batch processing complex 210 may be configured to stage input data, and store large-volume data output. In some cases, the content of produced data objects stored in LSS component 120 may be synchronized to corresponding objects in other databases, such as databases operating on DC component 130. For example, as will be described in more detail below, HDFS 202 may be provided in communication with other modules operating on LSS component 120, such as user feature extractor modules 212, user profile merger modules 214, model builder modules 216, and user scoring/segmentation modules 218. User feature extractor modules 212, user profile merger modules 214, model builder modules 216, and user scoring/segmentation modules 218 may be system components or software modules configured to process data stored in HDFS 202, and parse, combine, and/or communicate data received from HDFS 202 or any other component of system 100, as desired. Such modules may also be provided in communication with any additional plurality of plug-in modules, data flow modules, and/or external modules, as will be described in more detail below. LSS component 120 may be used when large amounts of data are desired to be stored and processed in HDFS 202. Typical use scenarios may include large-scale data fetching and profiling (e.g., tens of millions of users, hundreds of millions of web pages, etc.), archiving of various data (performance data, historical data from different systems, etc.), and staging large input data sets (event data, behavioral data, etc.). Of course, LSS component 120 may be scaled out by incorporating additional machines to accommodate increasing numbers of users and web pages.

As shown in the embodiment of FIG. 2, caching, indexing, and retrieval complex 220 may include a plurality of distributed cache (DC) modules 204 provided as a distributed cache or distributed in-memory database table. DC modules 204 may be used where fast lookup is desired for medium or large sized data sets. DC modules 204 may also be used as a communication channel for synchronizing and passing data between modules. DC modules 204 may include non-persistent cache, which may be used as transient data storage or a communication channel when there are no requirements on data persistency. For example, memcached may be a suitable distributed memory caching system. However, persistent cache may also, or alternatively, be used as transient data storage or communication channel when there are requirements on data persistency. For example, a MySQL Cluster may be a suitable persistent caching system. Distributed cache may be selected based on other requirements, such as indexing. If a simple key-value, hash-table based lookup is desired, memcache may be a good candidate. If indexes on multiple columns or composite indexes are required, some other solution, e.g. MySQL Cluster, may be desired.

In one embodiment, modules 200 may also include any type or combination of distributed retrieval database (DRD) modules, which may be implemented as Solr/Tomcat databases, or any other enterprise search servers. For example, DRD modules may include a contextual index, such as a Lucene/Solr distributed index, Sphinx distributed index, or Lemur/Indri distributed index. These components may be used for indexing of text content. Although not necessary, for performance reasons, it may be desired that the size of individual index shards is such that each shard can be stored in main memory on its node. The DRD modules may also be distributed MySQL servers (e.g., servers on multiple nodes used for partitioning or replication purposes). In one exemplary embodiment, the DRD modules may be single-node MySQL servers used to store medium-sized data sets for analysis, reporting/presentation, and other purposes. The data stored in such a server may be used to build an interface directed towards data consumers, data analysts, and/or business and sales entities. In one embodiment, DC and DRD modules may be implemented using the same software: for example, MySQL server may have part of the schema in in-memory tables, serving as a DC module, whereas the other part can be in disk-supported tables, serving as a DRD module.

In addition to DC modules 204, various flow components, processes, and/or plug-in modules may be incorporated in the system to implement and synchronize data flow between modules. Examples of flow components may include fetchers, parsers, indexers, segmenters, user grouping modules, etc. Plug-in modules may use available information to infer, summarize, or conceptualize information and generate new features for downstream segmentation processes. The available information may be received from ad servers 106, publishers 104, external data sources, etc. The features for segmentation may include any characteristic or variable to define or segment users, such as demographics, click history, etc. Plug-in modules may also serve to generate useful information related to system monitoring, reporting, and troubleshooting.

One example of plug-in modules may include content classifiers of fetched URLs, which may use information in a contextual format, and produce classes (either a set or hierarchical tree) related to that information. For example, contextual classifiers may classify news documents to topics like sports, entertainment, leisure, business, etc. One example of a content classifier is a Wiki-based classifier, such as one that uses the Wikipedia knowledge base to determine relationships and significance between various words and concepts.

Plug-in modules may also include feature weighters and extractors, which may receive information, in contextual, numeric, or other form, and distinguish between more and less important features for the task at hand. In one embodiment, feature weighters and extractors may act as weighting algorithms, assigning different weights to input features. Often, feature weighters and extractors involve filtering based on some weight threshold to produce a reduced set of features for subsequent processing. Feature weighters and extractors may be used in combination with feature generators, either up- or downstream from feature weighters and extractors. One example of a feature extractor includes a "term merge and weighter" for user contextual profiles, in which terms are weighted based on their position and element membership in the original file, their recency, their frequency in the original document, and their frequency in all documents for a single user. In some cases, feature weighters and extractors may filter out terms as being noise or undesirable information.

Plug-in modules may also include feature generators, which may be used to produce new features based on available features. One example of a feature generator may include an inferred demographics plug-in that uses existing information about user segments, available element types, site visitations, etc., to predict certain demographic features, such as gender, age, etc. Such generated feature values may be used to enhance user profiles for which that information is not originally available. Another exemplary feature generator may include a time-based click counter for predictive modeling of action probability. For example, a time-based click counter may produce features that count the number of clicks for a given user within the past N hours on the network. This newly produced feature may be used (as one of many features) for predictive modeling of action probability for that user.

Plug-in modules may also include filters, which may be used to filter out undesirable information for downstream processing. For example, content classified as 'spam', 'wow', '404 page', 'login page', etc., may be filtered out in the event that it is of no interest for further processing. Filters may act at the level of other information objects. For example, a user profile may be filtered out if it does not contain enough information, if its information is deemed unreliable, or for similar reasons. Filters may also eliminate features that do not contribute to a user's likelihood of being classified in a segment, such as websites visited only once, etc.

Plug-in modules may also include meta-estimators, which may be used to provide the system with any information desired to complete its tasks. For example, a fetch-period estimator may estimate the lifetime of a content page between two fetches, or the time that can pass before re-fetching a page with a given URL. Another exemplary meta-estimator may include a scorer that scores documents in real time based on a combination of criteria, such as: the number of previous matches within the past N hours; the total matching score within the past K matches; the most recent number of impressions, etc. These scores may be used for document re-ordering in the next matching run, database maintenance in the case of resource constraints, and similar situations. Typically, information from meta-estimators may be returned to the database for further use by different services and processes.

Plug-in modules may also include external modules, which may be used for miscellaneous tasks at different places in the pipeline. For example, a dedicated external service may be used for retrieving additional information for a given URL, such as: extracted document content, a set of content categories, extracted document features, etc.

In addition, a reporting service may be used for reporting and monitoring system performance, by accessing information from live and archive databases. The reporting service may produce statistical summaries, charts, plain file tabular representations, database tables, etc. The reporting tool may be used to connect to the database table, and generate miscellaneous statistical information, charts and reports, for display on a screen. Another exemplary suitable reporting tool may be used for displaying various charts, tables, etc. that describe the response of various web populations to an advertiser's campaigns and products.

Finally, data analysis tools may be used for analyzing data produced by the various modular flows, for example, by connecting to one or more DRD modules or DC modules. Examples of such tools may include Statistica Data Miner and SAS Enterprise Miner. Data analysis tools may also include front-end reporting tools, various in-browser scripting and visualization tools, etc.

In certain embodiments, advertisers, publishers, and/or ad network facilitators may assign a web cookie and/or unique user ID to each computer or Internet-enabled device identified as visiting a site in the ad network. In one embodiment, cookies may allow tracking of a user across websites in the ad network by identification of the assigned user ID. For example, cookies stored locally on a user's computer may be accessed to identify the user and to determine the last time that the user viewed the advertisement and/or a web page. In addition, in instances when a cookie is unavailable, a virtual cookie may be used. A virtual cookie may be derived from available information such as the user's IP address, browser type, geographic location, connection speed, or any other accessible and appropriate session level data. In certain embodiments, data may be obtained for each user, which represents the user's tendency to return to a specific web site in a given period of time. This data may be initially generated using estimated figures based on known user attributes. The estimated figures may be modified over time using user viewing logs. User viewing logs may be created by storing the viewing patterns of a user over an extended period of time.

In one embodiment, a profile may be generated for each user or group of users, the profile including comprehensive, timely information about the user or group of users, such as: geographical information, such as country, province (US state), metro area, city, zip code, and/or Standard Industrial Classification (SIC); demographic information (when available), such as age, gender, household income, marital status, homeowner status, age of household members, etc.; user session information, such as type of internet connection, computer operating system, web browser type, language, user hour, etc.; contextual information, including aggregated contextual profile of the user and/or visited URLs; and/or user events and time-based information, i.e., the where, what, and when of page views, clicks, purchases, etc.

A large scale ad network system 100 can have millions of users, billions of user cookies (due to deletions and new creations and brower settings), hundreds of thousands of advertisers and ads, hundreds of thousands of publisher sites, etc. In one embodiment, user segmentation and predictive audience modeling may operate in a scale that can take into account the dynamics of such a network and produce user segments in a timely manner. For example, user cookies may be created and deleted frequently, to the extent that some cookies in a user segment generated based on weeks-old data might not be present in the network anymore. The interests and the behaviors of a user may also change over time. Therefore, user segments may be updated frequently (e.g., weekly, daily, or even hourly) so that user segments are more accurate reflections of the user's interests, behaviors, and expected responses.

The above-described systems, software modules, plug-ins, and tools may be used to perform various exemplary user segmentation methods. In particular, the exemplary LSS component 120 may be a shared resource of data and processing power for running map-reduce jobs. In general, map-reduce jobs may include: receiving user event data, extracting and merging user data based on a target feature, building a model based on the target feature and model specifications, using models to score users based on merged user data, and segmenting users based on their scores.

Figure 3:
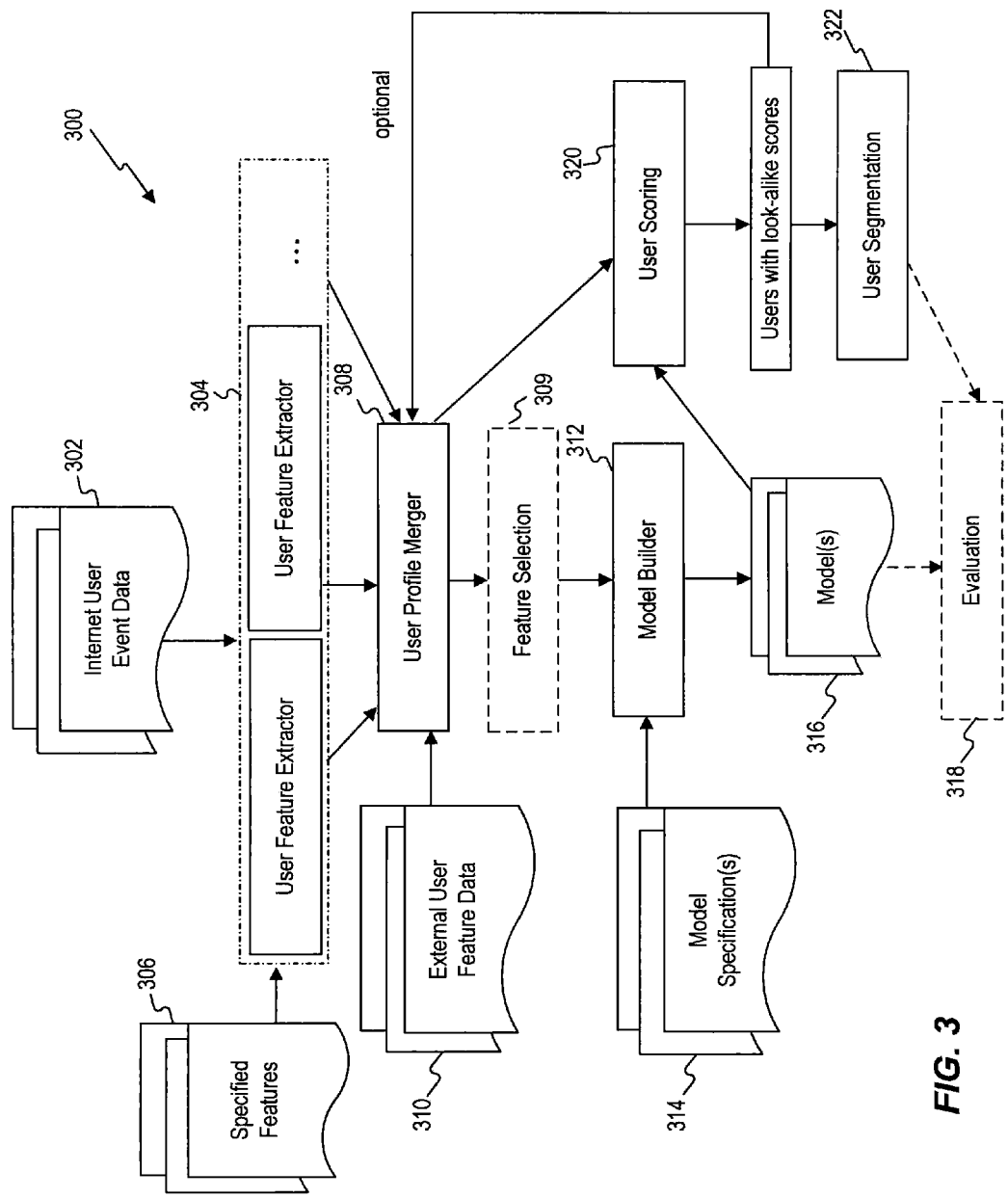
FIG. 3 depicts a block diagram of another exemplary system for generating expanded user segments.

Referring now to FIG. 3, an exemplary system 300 is shown that receives user event data 302 from various entities (such as those shown in system 100) of FIG. 1, based on user profiles, cookie data, or any other files storing users' interaction with the Internet, ads, and/or websites. For example, various data logs may be received from publishers 104 and/or ad servers 106, including: behavioral logs, leadback logs, click logs, action logs, and/or impression logs. FIG. 3 illustrates the exemplary receipt of raw incoming user event data 302. Such data may be based on, e.g., impression, event, behavioral logs, and include information such as a user ID, date and timestamp, URL, and frequency of visits. Of course, any additional data sources or logs may be accepted, including proprietary logs from various ad-serving services, advertisers, ad agencies, or data providers. Information from these and other input logs may be incorporated by using parsing adapters. For user segmentation purposes, it may be desirable for all of the different logs to have a unique identifier or user ID that is either unique across all logs or mappable to other unique user IDs. In one embodiment, each of the logs may include one field with a user ID, and additional fields with data describing the characteristics and/or properties of any event, such as a page view, click, or purchase. The logs may also include a timestamp of the event, and a referring URL, if relevant. As discussed above, some of the data from the logs may be staged in the HDFS 202 operated on LSS component 120. In one embodiment, the user event data 302 may be user data derived from the raw logs and/or processed data from another pre-processing system. An example of a preprocessing system includes the daily user profiling systems and method disclosed in U.S. patent application Ser. No. 12/558, 891, filed by Pero Subasic et al. on Sep. 14, 2009, the entire disclosure of which is incorporated herein by reference.

In the exemplary embodiment of FIG. 3, specified (i.e., "target") features 306 may be provided. The specified features 306 may be particular user characteristics desired by advertisers, publishers, analysts, and/or researchers. Examples of specified features 306 of users include: users with demographic values, such as age, gender, and income; users with certain demographic features, e.g., "age=25-34 and homeowner=true"; users from certain geographic (Geo) locations, e.g., "state=california"; users who responsed to a certain campaign or media in a specified time period, e.g., "clickers of an ad during the past 7 days"; users who converted after seeing a campaign, e.g., "viewer convertors of a campaign"; users who have visisted n web pages of certain content categories in k days, e.g., "5 views of Auto pages in the past 7 days"; and/or users who have at least 10 searches daily.

Given one or more specified features 306, one or more user feature extractors 304 may be used for extracting users that contain the specified features 306, together with the respective feature values (i.e., "feature value pairs" that include a unique feature ID and its feature value, where the "feature value" can be categorical or numeric). User feature extractors 304 may be software modules configured to process and extract data from user event data 302. Exemplary user feature extractors 212 are shown in FIG. 2. In one embodiment, one or more user feature extractors 304 may be used for extracting users with each of the particular target features and their values. Optionally, if the feature data is already present in a profile associated with a user, then user features can be retrieved directly from the user profiles. Exemplary formats of outputs from user feature extractors 304 are depicted as follows:

EXAMPLE-1

Features Extracted for Five Different Users user111 actor.241954982=1;actor.654256168=1;
user222 actor.654256168=1;
user333 actor.239528831=1;actor.654256168=1;actor.391837719=1;
user444 actor.525600614=1;actor.660514477=1;actor.431774379=1;
user555 actor.930523096=1;
where user222 is an actor of campaign 654256168, user333 is an actor of campaigns 239528831, 654256168, 391837719, etc.

EXAMPLE-2

Feature Extracted Over 30 Days of Logs Aggregate

For user666: cat.AAA=5;site.12326=13;cat.BBB=3; cat.CCC=1;cat.DDD=4;
where user666 has visited 5 pages of content category AAA in a data provider network (cat.AAA=5), has visited the website 12326 13 times (site.12326=13), etc.

Outputs from user feature extractors 304 may be passed to a user profile merger 308, where each user may be represented by the feature value pairs provided by the user feature extractors 304. User profile merger 308 may be a software-implemented module. An exemplary user profile merger 214 is shown in FIG. 2. For all features that are used for representing the users, the feature value pairs can be represented as a sparse matrix or a full matrix to be used for later processes. User profile merger 308 may also be provided with external user feature data 310, which may be provided directly by customers, clients and/or third-party collaborators. The output from user profile merger 308 may be an aggregate of all the features produced by user feature extractors 304. An exemplary format of the output from user profile merger 308 is provided as follows:

EXAMPLE-3

Merged User Profile Data for a Single User

For user123:
  e.4288.378754=1;e.3177.379942=1;e.1877.365865=1;
  e.408.320124=1;e.206.35 636=1;e.10.377801=1;
  e.7333.396718=1;e.2217.369199=1;predicted.actor.62365
  3590=1; predicted.actor.909252346=1; predicted.actor.641179380=1; predicted.actor.186607004=1;predicted.actor.627636138=1;predicted.actor.815654930=1;
  site.16730=2;site.16666=1;predicted.actor.612052554=1;
  site.17777=5;click.11111=4;actor.895672020=1;
  actor.188060937=1; . . .
where user123 has visited a few sites (site.*=*); has several proprietary feature values (e.*.*=1) including GEO, demographic, behavior and contextual features; is actors for several campaigns (actor.*=1); is clicker of several campaigns (click.*=1); and is predicted to be in quite a few lookalike actor segments (predicted.actor.*=1).

The output from user profile merger 308 may be passed to a model builder 312, which may be a software-implemented module configured to use various automated learning methods to build segmentation models. In one embodiment, the output from user profile merger 308 may optionally be passed through a feature selection module, to filter the features that will be used during model building. An exemplary model builder 216 is described above with reference to FIG. 2. In one embodiment, the task of generating expanded, look-alike user segments may be formulated as a supervised learning task, where the desired outputs are explicitly specified. The training set may consist of instances, each of which is represented as an input feature vector and a target value. The output of the learning task can be a continuous value (e.g., the probability of a user clicking on an ad) or a class label (e.g., "predicted-actor" denoting the user belonging to the actor class). Various learning methods can be used, e.g., random forest modeling, linear regression, logistic regression for continuous output values and Naïve Bayesian classifiers and SVM for classification (i.e., assiging class labels).

In one embodiment, model builder 312 may model the task of generating expanded, look-alike user segments as a classification task, e.g., by using a Naïve Bayes classifier. The problem can be formulated as described in the example below:

Given a user U represented as a tuple of n feature values $<x_i>$, classify U into one of the classes $c_j \epsilon C$, subject to:

$$c_{pred} = \underset{c_j \in C}{\operatorname{argmax}} P(c_j | x_1, x_2, \ldots, x_n) = \operatorname{argmax} \prod_{x_i} P(x_i | c_j) P(c_j) \quad (1)$$

where $c_{pred}$ is the most likely class into which user U belongs. The classifier returns the class label with the highest probabity of the class given the user features. Models can be built on a specific types of features, e.g., demographic, GEO, contextual features, behavioral features, and/or any combination of features.

In one embodiment, model builder 312 may be provided with model specifications 314 for building models. Model builder 312 may then receive aggregated user feature profiles from user feature profile merger 308, and produce a training data set based on model specifications 314. The model specifications 314 may include one or more files or sets of data that specify various parameters for building a model. Generally, model specifications 314 may describe the target classes (i.e., specified features 306), a list of features used as independent features or predictors, sampling rates for preparing training instances of different class values, the methods used for modeling, and/or the rates of samples reserved for training and evaluation.

As an example, when using a Naïve Bayes classifier for modeling advertiser converters based on user visitation to selected network sites, the target classes may be "advertiser-converters" and "advertiser-non-converters". The independent features can be a list of sites pre-selected to be the most discriminating in separating the advertiser converters from the advertiser non-converters. The positive training instances are users who are labeled "advertiser-converters" and the negative training instances are users who are labeled "advertiser-non-converters". As another example, the target classes could be different age groups, such as "teen", "18-24", "25-34", etc. The training set for age group modeling then consists of user records labeled by the different class values. An exemplary format of a model specification 314 is provided below:

```xml
<ModelSpec>
  <FeatureFilters>
    <SampleFeatureFilter>
        <nonExistFeatureValueSubstitute>0</
        nonExistFeatureValueSubstitute>
            <featureKey>actor.514777774</featureKey>
              <category>
                <entry featureValue='0'>.062383</entry>
                <entry featureValue='1'>1</entry>
              </category>
    </SampleFeatureFilter>
    <SelectedFeatureFilter>
        <observedFeatureCntThreshold>1</
        observedFeatureCntThreshold>
        <nonExistFeatureValueSubstitute>0</
        nonExistFeatureValueSubstitute>
        <targetFeature>actor.514777774</targetFeature>
        <selectedFeaturesPath>/system/features/
        selectedFeatures</selectedFeaturesPath>
    </SelectedFeatureFilter>
  </FeatureFilters>
</PMBayesMultinomial>
```

For each model, a modeling specification 314 may describe how the model is to be built. In the example above, the target (dependent) feature may be "actor.514777774"; and the input independent features may be stored in a file specified by the file path, "/system/features/selectedFeatures." Modeling specification 314 may also include specific constraints on the feature set, e.g., "<observedFeatureCntThreshold>1</observedFeatureCntThreshold>", which provides that each instance should contain at least one observed feature.

The <SampleFeatureFilter> elements may specify how the sampling is performed for building training examples. For example, the value: "<entry featureValue='1'>1</entry> may specify that for target class value "1" (in this case positive examples), take 100% of the instances with target value as 1 as training instances. The value: "<entry featureValue='0'>0.062383</entry>" may specify that for target class value "0" (in this case negative examples), randomly take 6.2% of the instances with target value as 0 as training instances. In some cases, the positive example set may be quite small, while the rest of the network as background may be larger, which results in small sampling rates for negative examples. Sampling may be used to avoid calculating values for the whole network (hundreds to billions of users as training examples). By way of example, the content of the feature file named: "/system/features/selectedFeatures" may define the following features for inclusion in modeling:

site.12030
site.16649
site.16390
site.11775
site.16726

In the above example, a list of network sites may be used as the features for modeling users' visitation behaviors. In other words, out of all the possible features describing the users in the output from user feature profile merger 308, the model specification 314 denotes that the modeling might only take into consideration the features listed in the specified feature file.

Model builder 312 may then produce one or more models 316, which may include one or more files including at least the model parameters of the classification method. Optionally, models 316 may include files storing model building confiquation, reserved data sets for model evaluation, and the model evaluation statistics. The files can be stored in a local file system, a distributed file system, and/or in memory. For example, when using the Naïve Bayes classification method, the files for models 316 may include the model itself, which stores the parameters of the class priors and the conditional probablities of the classes given the features, the reserved data set for model evaluation (if a percentage of training data is specified for evaluating the model), and/or the evaluation statistics, including confusion matrix, accuracy, precision, recall, false positive, and false negative.

In the case where a model is built based on "site" features, the following model fragment may record the parameters for the model. For the Naïve Bayes method, the model may include class priors (Class Prior: {0=0.9764964928449477, 1=0.023503507155052294}) and the estimated probabilities of the feature given the class. E.g., "site.12642 2.346108848276204E-5 3.765695766796409E-5" gives the value for estimated probablity of the feature site.12642 given the class value 0 as 2.346108848276204E-5 and the estimated probability of the feature given the class value 1 as 3.765695766796409E-5. Exemplary formats of models 316 are provided below:

| MODEL EXAMPLE 1: Naïve Bayes Method | |
|---|---|
| Model Info | |
| Model Path: /ActorModels-660/actor.747997469 | |
| Target Feature: actor.747997469 | |
| Number of Attributes: 971 | |
| Class Prior: {0=0.9764964928449477, 1=0.023503507155052294} | |
| Model Details | |
| Class : 0 has 2227159 number of records. | |
| Class : 1 has 53605 number of records. | |
| Number of Instances to build the model: 2280764 | |
| The probability of a word given the class(log value) | |
| | 0 | 1 |
| site.12231 | 1.0112538139121559E-7 | 3.3032419006986E-7 |
| site.12238 | 2.5281345347803895E-8 | 3.3032419006986E-7 |
| site.12237 | 2.5281345347803895E-8 | 3.3032419006986E-7 |
| site.12642 | 2.346108848276204E-5 | 3.765695766796409E-5 |
| site.12643 | 1.264067267390196E-7 | 3.3032419006986E-7 |
| site.12640 | 4.3233628679279526E-4 | 2.5732254406442116E-4 |
| site.13259 | 0.01452615540994118 | 0.014323517529809284 |

Model parameters may be different depending on the modeling method used. For example, the linear regression model may produce a model output that specifies the coefficients of the features. In the following model fragment, the feature MYCT has a coefficient 0.0661.

| MODEL EXAMPLE 2: Classifier Model (Linear Regression Model) class = |
|---|
| 0.0661 * MYCT + |
| 0.0142 * MMIN + |
| 0.0066 * MMAX + |
| 0.4871 * CACH + |
| 1.1868 * CHMAX + |
| −66.5968 |

In one embodiment, model builder 312 may optionally include a feature selection step for selecting only the features that are most discriminating for assigning users to different classes. For example, the features selection step may include computing various statistics, and may employ different feature selection methods for determining the validity and the discriminativeness of various specified features. The various statistics may be used for filtering out features that are noisy or irrelevant. For example, thresholds may set at feature levels or user record levels for filtering out certain features or user data, e.g., discarding all sites with fewer than 100 unique users, or discarding all users with fewer than 10 impressions over 30 days. Feature-class pair related counts can be used for determining the relationships between features and classes. Such counts enable different feature selection methods to identify the most discriminating features while discarding the less discriminating features. This process may remove the features that do not contribute to model building, while at the same time reducing the feature space for model building. Example feature selection methods include Chi-squared testing, divergence, mutual information, information gain, etc. Inputs to feature selection may include the outputs from user profile merger 308. Alternatively, multiple sets of features can be passed to model builder 312, and models for these feature sets may be produced. Outputs of feature selection may include a ranking of these features based on a feature selection formula.

For purposes of illustration, the following is an exemplary ranking of the "site" features for the target "actor.920116604," based on mutual information. For a different target, the ranking may be different, because the discriminating powers of the features may change with respect to the different targets.

| target: | feature | score |
|---|---|---|
| actor.9201 | 16604:site.16730 | 0.0073554 |
| actor.9201 | 16604:site.16769 | 0.0033966 |
| actor.9201 | 16604:site.16674 | 0.0025585 |
| actor.9201 | 16604:site.16376 | 0.0025171 |
| actor.9201 | 16604:site.16771 | 0.0022816 |
| actor.9201 | 16604:site.16767 | 0.0009751 |
| actor.9201 | 16604:site.11775 | 0.0009148 |

In one embodiment, the models 316 may be further evaluated by evaluation module 318. For instance the models 316 and/or user segments generated by user segmentation 322 may be evaluated by evaluation module 318 for accuracy and fitting error. Evaluation statistics may be generated, including confusion matrix, accuracy, precision, recall, false positive, and false negative. The model parameters and the evaluation results of the respective models can be returned back to the feature selection module as additional statistics for feature selection.

Given suitable models 316, a user scoring module 320 may be a software-implemented module that receives one or more models 316, and optionally the modeling specifications 314, for application to one or more user records provided by user profile merger 308. An exemplary user scoring/segmentation module 218 is described above with reference to FIG. 2. In one embodiment, the features in the model may be applied to the user record and only features present in the model are maintained for scoring the user. Each user may be given a score computed based on the specified classification method and the parameters of the method from the model 316.

Reference will now be made to an exemplary embodiment in which model builder 312 implements the Naïve Bayes Multinomial model. In this embodiment, the model builder 312 may implement methods for estimating the parameters for the specific models, such as class priors and probabilities of classes given the individual features. The parameters may then be estimated based on the training data. The learned parameters can then evaluated by evaluation module 318 for its accuracy and fitting error.

Below are exemplary results produced by the Naïve Bayes Multinomal classification method, where the first column of each record specifies the user ID and the second column of the record specifies the probability of the user being a campaign actor given the visitation history of the user.

| UserID | Probablitiy of user being actor given visitation history |
|---|---|
| User123 | predicted-advertiser.actor = 0.5886; |
| User456 | predicted-advertiser.actor = 1; |
| User678 | predicted-advertiser.actor = 0.99997; |
| User789 | predicted-advertiser.actor = 0.99998; |
| User567 | predicted-advertiser.actor = 0.78781; |

Another output from user scoring module 320 can be the class values of the user. One exemlpary way to determine the class to which each user belongs may be based on the above-described formula (see paragraph 0054) by selecting the class with the highest class probability given the user features. Another way to determine the predicted class of each user is by setting a threshold (e.g., 0.80) and assigning the user to a class if the predicted probablity of the class is above the threshold. The predicted scores or predicted classes of the user may optionally be fed back to user profiler merger 308 and serve as input features for model building.

The scores produced by user scoring module 320 may be utilized for grouping users into different segments. For example, numerical thresholds can be set for determining whether a user belongs to a certain segment of a class. If, for a given user and a given class, the predicted score is above a given threshold, the user can be considered as a member of the segment. By varying the threshold value, the sizes of the predictive segments can be controlled. Predictive segments based on different thresholds may produce different responses and optimization can be set accordingly.

In one embodiment, the system 300 may be implemented as a distributed system that builds multiple models, and conducts modeling and prediction for multiple target requests simultaneously. As an example, for the Naïve Bayes classifier, raw counts such as frequency, feature reach, feature-class frequency may be collected first for probabilities computations. One method may include taking one model configuration at a time, going through the merged user profiles and producing the counts. In some networks, the number of user profiles over 30 days can involve hundreds of millions to billions of cookies. For N models, the process may be repeated N times. Building the N models sequentially may involve going through millions or billions of user records N times. Thus, one exemplary method includes incrementally updating N models simultaneously as the system processes through user records (i.e., going through each network user profile once and updating the model parameters of the N models while processing every user record). In this case, the millions or billions of user records need be retrieved only once, even while updating N models. The models can be stored in local files, distributed file systems, memory, and/or in a centralized memory cache, such as memcache. Once all user records are processed, the models can be exported to local disks or remain in memory for prediction.

Likewise, in large scale networks, user scoring module 320 may score the network users for each of the models. One method may include processing one model at a time, and scoring the network users based on each model. For N models, the process can be repeated N times. Scoring the network users with N models sequentially may involve going through millions or billions of user records N times. Thus, an exemplary method may involve going through each network user profile once and scoring every user record against the N models simultaneously. In this case, each of the user records need to be retrieved just once, but scored N times for N different models.

Likewise, optional steps including feature selection and evaluation 318 may be performed simultaneously on multiple targets so that repeated computation over different targets need to be performed only once.

Figure 4:
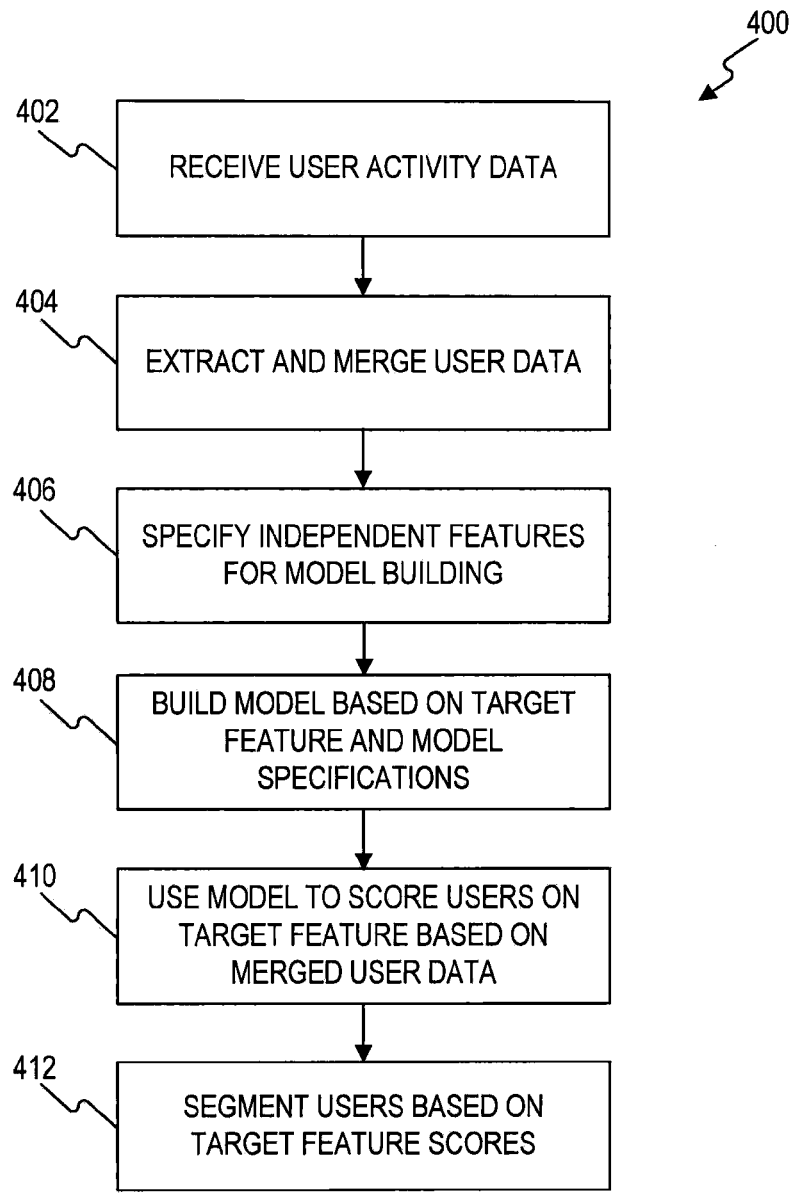
FIG. 4 depicts a block diagram of an exemplary method for generating expanded user segments.

The exemplary embodiment 300 of FIG. 3 may be used to perform any combination of methods for generating expanded segments of online users. One such method is the exemplary method 400 depicted in FIG. 4 for generating expanded user segments. As shown, method 400 may include receiving user activity or event data (step 402). For example, method 400 may include receiving user event data 302. Method 400 may further include extracting and merging user data based on one or more target features (step 404). For example, user feature extractors 304 and user profile merger 308 may be used to generate a profile of features for each user. Method 400 may further include specifying one or more independent features for model building (step 406). For example, feature selection methods may be used for determining the validity and the discriminativeness of various independent features (e.g., discarding features that do not contribute to likelihood of a user having the target feature). Method 400 may further include building a model based on the target feature and model specifications (step 408). For example, model builder 312 may be used to build models 316, based on model specifications 314, as described above.

The models may then be used to score users on the target feature based on merged user data (step 410). For example, in one embodiment user scoring module 320 may generate target feature scores by applying models 316 to the merged user profiles generated by user feature profile merger 308. Finally, method 400 may further include segmenting users based on their target feature scores (step 412). As part of this step, user segmentation module 322 may be used to generate expanded segments of users. For example, user segmentation module 322 may generate segments of users that "look-alike" to the target class of users.

The expanded or look-alike segments may be recorded or conveyed in the form of tables and graphs/charts. By way of example, the exemplary charts and tables of FIGS. 5-8 show expanded or look-alike segments consistent with the teachings of the present disclosure.

Figure 5:
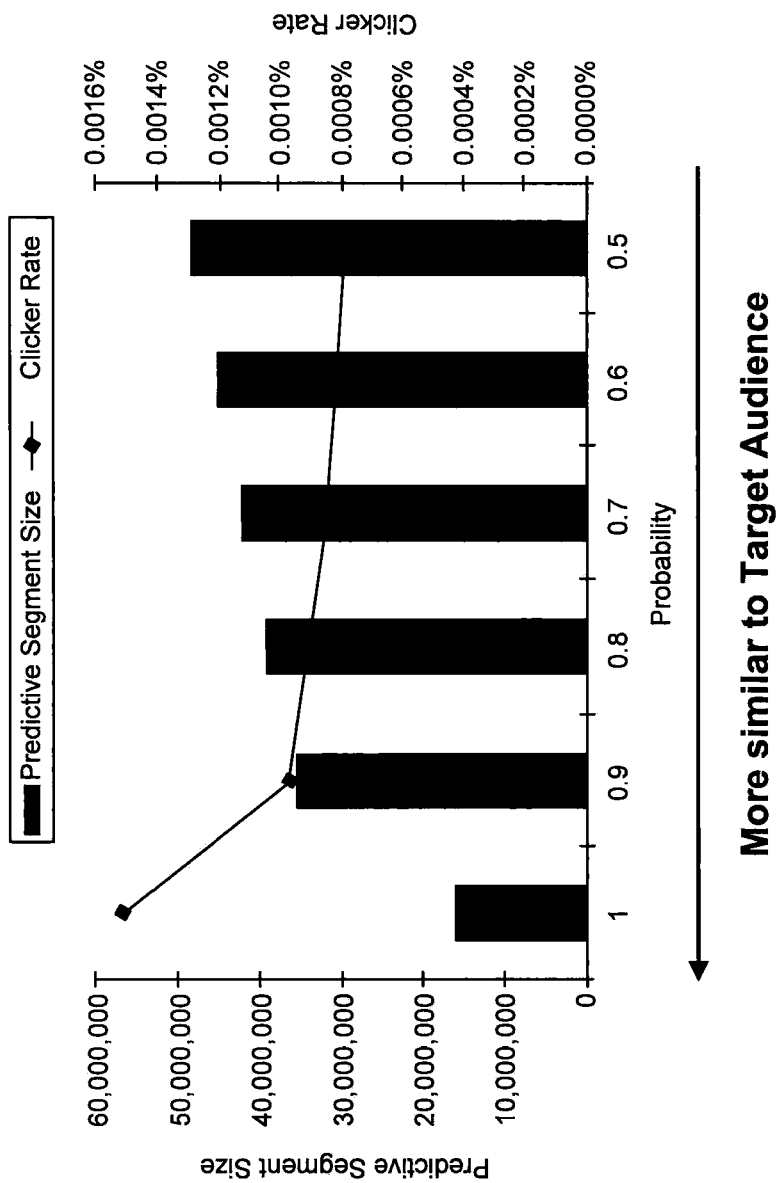
FIG. 5 depicts an exemplary graph of expanded user segments.

For instance, FIG. 5 is an illustration of expanded segments created at different score thresholds and their effects on the clicker rates of a campaign. As the score thresholds decrease, the segment sizes increase, and the response rates (e.g., clicker rate) of the campaign decreases. Conversely, as the thresholds increase, the segment sizes decrease, and the response rates increase. In other words, the target audience is more tight and similar to the target audience as probability threshold increases. An optimization system may utilize the response rates of the segments and assign appropriate bid prices accordingly.

Figures 6A, 6B:
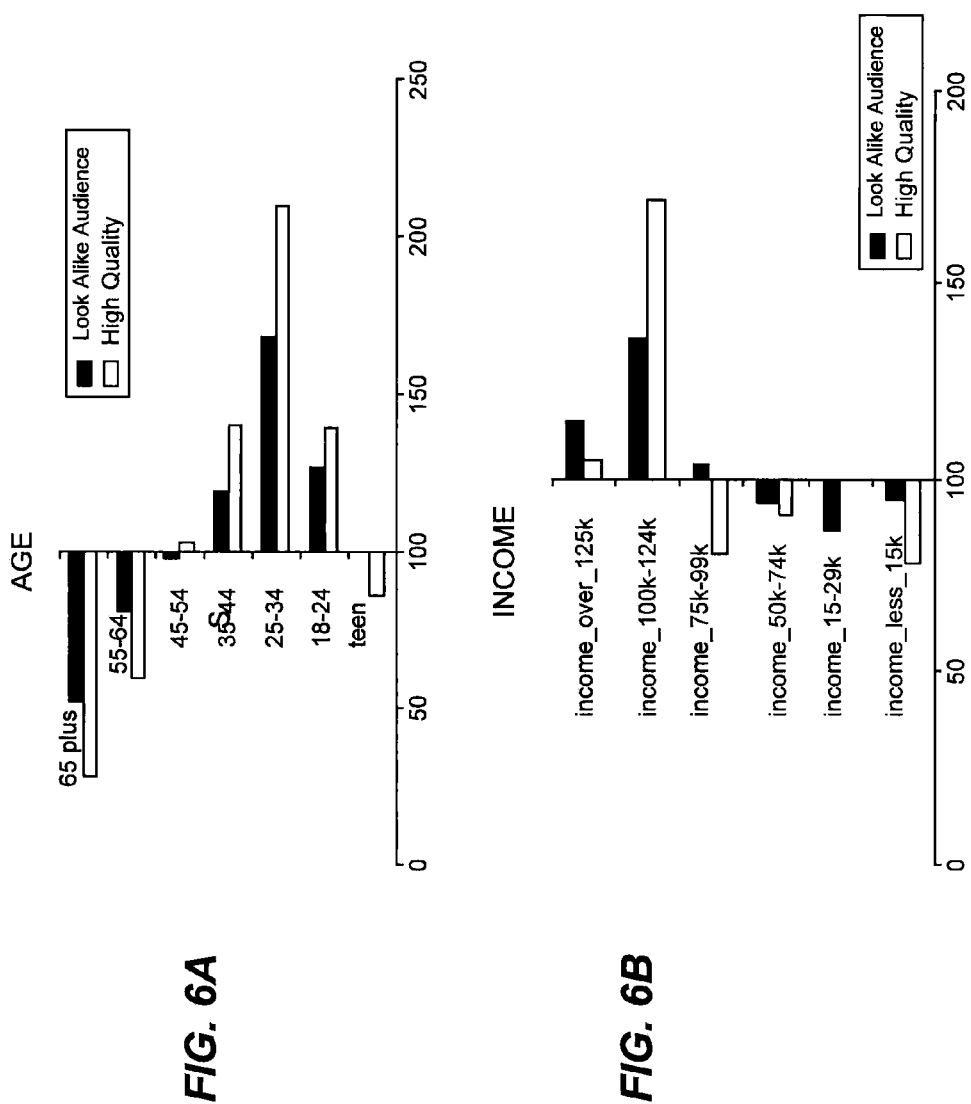
FIGS. 6A and 6B are exemplary graphs of the ages and incomes of "high-quality actors," respectively.

Qualified audience profiles may be generated for an expanded look-alike segment based, in particular, on features that are of interest to an advertiser. Thus, a target audience of "high quality" actors and a look-alike segment of the target audience may be profiled against demographic features based on user visitation behavior. As an example, as shown in FIGS. 6A and 6B, it can be seen that as compared with the average Internet user, "high quality" audiences are likely to be high income earners (FIG. 6A) and of the younger generations (FIG. 6B). Users associated with a look-alike audience may be demonstrated to have characteristics similar to those of the target audience.

As described above, look-alike segments may be used by advertisers 102, publishers 104, ad servers 106, and/or devices 108 to conduct more effective and efficient targeting. FIG. 7 provides an exemplary illustration of the effectiveness and efficiency of using expanded look-alike segments for targeting. For example, given a particular advertiser's campaign, the advertiser subnet (i.e., a subset of network sites approved by the advertiser) may have had an actor rate of 0.013%, while the advertiser actor look-alike segment may have had an actor rate of 0.064%, which is significantly better than the former actor rate. With a look-alike segment, the campaign may be able to focus on the audience that is most likely to act for the campaign, reducing the inventory cost while improving user response rate.

Figure 8:
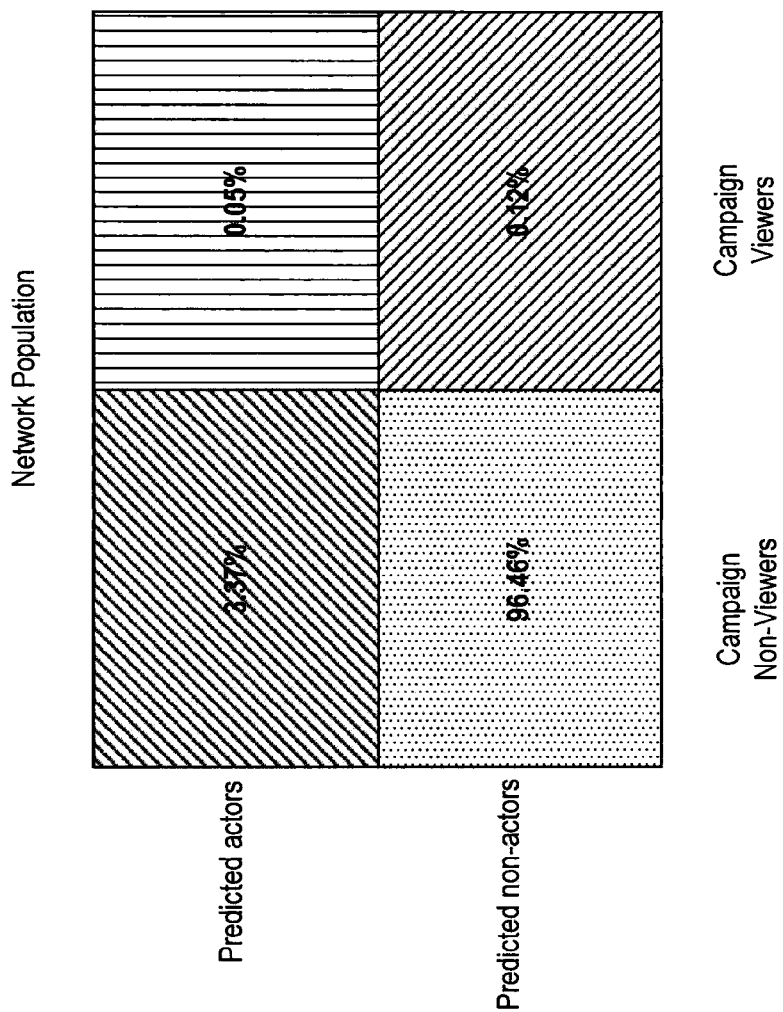
FIG. 8 depicts an exemplary table comparing the proportion of predicted actors and non-actors in an advertising network population.

Look-alike segments can also be used in combination with existing campaigns to increase the targeting inventory. FIG. 8 provides an exemplary graphical representation of a campaign in which an advertiser may wish to target a leadback population that is small (i.e., a small set of campaign viewers). By using the systems and methods described herein, it may be possible to identify an expanded user audience that is very similar to the leadback population of campaign viewers, thereby extending the potentially profitable reach significantly to an additional 3.37% of the population.

Of course, it will be appreciated that the exemplary graphical depictions of FIGS. 5-8 are merely illustrative in nature, and should not be construed to limit the embodiments or the present disclosure in any way.

Identified expanded user segments may be used to calculate bids specific to each user segment. Such segment-specific bids could then be submitted to a bidding optimization engine for optimization and targeting. User segments offer additional information to optimization engines by identifying high-performing look-alike user segments suitable for targeting. For instance, in a bidded marketplace for online advertising, an advertiser's bid may describe the target inventory of web pages for the advertising campaign, as well as specify the maximum price per advertising request and the maximum request volume that an advertiser desires for the advertising campaign. Advertisers may pay whatever cost per thousand (CPM), cost per click (CPC), or cost per action (CPA) they want on the inventory of their choice. Moreover, advertisers can define budgets, pricing, targeting, and frequency caps, as well as segment-specific information.

Further, publishers may maintain segmentation and demographic data regarding the web pages containing the available inventory, demographic data that may include, for example, the percentage of impressions created for people within specified age brackets, within certain geographic regions, within defined income levels, or within certain segments. Publishers may include this information within each ad request sent to an advertiser or ad server/exchange, including a base price for the inventory on a web page, below which the publisher is unwilling to vend the inventory. An exchange may then facilitate the placement of advertisements from an advertiser onto cells provided by publishers by matching advertiser bids with publisher requests, based on segmentation information, among other factors.

One method of incorporating segmentation into the optimization process may include computing the bid value based on the yield of a particular expanded segment. Because the circumstances of an advertising network may change rapidly, the process may be automated based on the following general steps: creating expanded user segments; computing main performance metrics of created expanded segments, such as click through rate or conversion rate; calculating the bid for each expanded segment based on the performance metrics; creating a user roster based on the computed bids; running the advertising campaign using the roster; and eventually re-creating the expanded segments for another round of optimization/targeting. The time period for re-creating expanded segments may be chosen to take into account changes in the network, such as active users, available content, campaign mix, short- and long-term seasonal impact, etc.

Various changing factors may impact the output of user segmentation, including: user focus changing due to different events; seasonal events, such as sporting events, seasonal interests such as skiing in winter, presidential elections, major seasonal sales events, or random events; long- and short-term temporal patterns, such as daily, weekly, monthly site visitation patterns differing for different sites; bias in the data, e.g., from passing through ad serving optimization and not representing a "fair" sample of user activity; campaign mixes changing as advertisers create and terminate multiple campaigns (e.g., more Ford campaigns would result in more users in the auto segment); publisher and topic mix changing, as more publishers are added to the system, or removed, etc. on an hourly/daily basis; and event sampling rate, publisher availability and noise in the data.

Expanded segmentation may also be used to improve ad serving optimization, by adding new user profile information as input to the optimization process. For example, contextual segments, and relationships between segments and inferred features (e.g., demographic features like age, gender, etc.) may provide novel information to optimization processes. Depending on the optimization scenario, these features may be used in direct targeting by advertisers, or inputted directly to the optimization engine to improve the yield of a particular campaign. In the latter scenario, bidding amounts can be dynamically adjusted (based on predicted segment performance) and submitted to the bidding and optimization engine. In addition, segments may be created based on a combination of several existing features in a novel way such that the yield for a particular advertiser/campaign is increased. This process may be fully automated, since existing features may be combined by applying machine learning techniques, such as clustering and classification. Estimated performance of these created segments can be computed based on available data from server logs for the same or similar user population.

Accordingly, the present embodiments may advantageously provide scalable, flexible access to integrated information about visitors to the various products and services in advertising networks. The embodiments may also display segment level information about web populations of interest to advertisers and publishers, as well as provide web populations that may be specially targeted for advertising. Moreover, the presently disclosed systems and methods may be used for segment evaluation prior to an advertiser actually committing to purchasing a targeting product offered in the advertising network.

Specifically, advertisers may be provided with user segment information for their customers, knowledge of how advertising affects different user segments, and knowledge of how sales can be improved through more effective advertising via user profiles and segmentation. Moreover, segmentation lift reports may be used to identify enterprise clients for custom insights and analytics, leveraging insights obtained from users across the network. Finally, users and/or user segments may be targeted and optimized based on profile information, thereby improving ad serving performance.

The many features and advantages of the present disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A computer-implemented method for generating an expanded user segment based on a target segment of users, the method comprising the following steps performed by one or more processors:
receiving information about online activity by a first plurality of users, the information including a unique user ID associated with each of the first plurality of users;
extracting, from the received information, data about the first plurality of users who are associated with a plurality of specified target features;
selecting a combination of two or more of the plurality of specified target features as an output for building at least one model;
building the model that represents the probability of any user being associated with the selected combination of the plurality of specified target features, based on the extracted data about the first plurality of users;
using the model to score a second plurality of users relative to the selected combination of the plurality of specified target features, based on information received about online activity by the second plurality of users; and
generating an expanded user segment by grouping users who have been scored above a threshold value for the selected combination of the plurality of specified target features.

2. The computer-implemented method of claim 1, wherein the information about online activity is obtained through one or more cookies.

3. The computer-implemented method of claim 1, wherein the received information includes one or more of: user profiles, cookie data, behavioral logs, leadback logs, click logs, action logs, and impression logs.

4. The computer-implemented method of claim 1, wherein the plurality of specified target features includes one or more of: whether a user provided certain demographic information, whether a user clicked on a particular advertisement, and whether a user is likely to convert to a particular campaign.

5. The computer-implemented method of claim 1, wherein the plurality of specified target features includes one or more of: a demographic value, a geographic location, a response to a campaign, a conversion, a view of a web page, and a click of an ad.

6. The computer-implemented method of claim 1, wherein the step of building a model is formulated as a supervised learning task.

7. The computer-implemented method of claim 1, wherein the model is built based on one or more of: random forest modeling, linear regression, logistic regression for continuous output values, and Naïve Bayesian classification.

8. The computer-implemented method of claim 1, wherein the model is built based on a list of independent features identified as being relevant to a user being classified in relation to the selected one of the plurality of specified target features.

9. A computer-implemented method for generating an expanded user segment based on a target segment of users, the method comprising the following steps performed by one or more processors:
  receiving information about online activity by a first set of users, the information including a unique user ID associated with each of the first set of users;
  extracting, from the received information, data about the first set of users who are associated with a plurality of specified target features;
  selecting a combination of two or more of the plurality of specified target features as an output for building at least one model;
  building the model that represents the probability of any user being associated with the selected combination of the plurality of specified target features, based on the extracted data about the first set of users;
  using the model to score a network population of users relative to the selected combination of the plurality of specified target features, based on information received about online activity by the network population of users; and
  generating an expanded user segment by grouping users who have been scored above threshold value for the selected combination of the plurality of specified target features.

10. The computer-implemented method of claim 9, wherein the plurality of specified target features includes one or more of: a demographic value, a geographic location, a response to a campaign, a conversion, a view of a web page, and a click of an ad.

11. The computer-implemented method of claim 9, wherein the step of building a model is formulated as a supervised machine learning task.

12. The computer-implemented method of claim 9, wherein the model is built based on one or more of: random forest modeling, linear regression, logistic regression for continuous output values, and Naïve Bayesian classification.

13. The computer-implemented method of claim 9, further comprising identifying independent features as being relevant to a user being classified in relation to the selected one of the plurality of specified target features.

14. The computer-implemented method of claim 9, wherein the received information includes one or more of user profiles, cookie data, behavioral logs, leadback logs, click logs, action logs, and impression logs.

15. A system for generating an expanded user segment based on a target segment of users, the system comprising:
  a memory storage device configured to store instructions for generating an expanded user segment based on a target segment of users; and
  a processor configured to execute the instructions and perform the following steps:
  receiving information about online activity by a first plurality of users, the information including a unique user ID associated with each of the first plurality of users;
  extracting, from the received information, data about the first plurality of users who are associated with a plurality of specified target features;
  selecting a combination of two or more of the plurality of specified target features as an output for building at least one model;
  building the model that represents the probability of any user being associated with the selected combination of the plurality of specified target features, based on the extracted data about the first plurality of the users;
  using the model to score a second plurality of users relative to the selected combination of the plurality of specified target features, based on information received about online activity by the second plurality of users; and
  generating an expanded user segment by grouping users who have been scored above threshold value for the selected combination of the plurality of specified target features.

16. The system of claim 15, wherein the memory includes a large scale storage component and the processor is provided in communication with a distributed caching component.

17. The system of claim 15, wherein the system is disposed in communication with one or more ad servers through the Internet.

18. The system of claim 15, wherein the system is configured to receive cookie data from users through the Internet.

* * * * *